Patented Oct. 2, 1923.

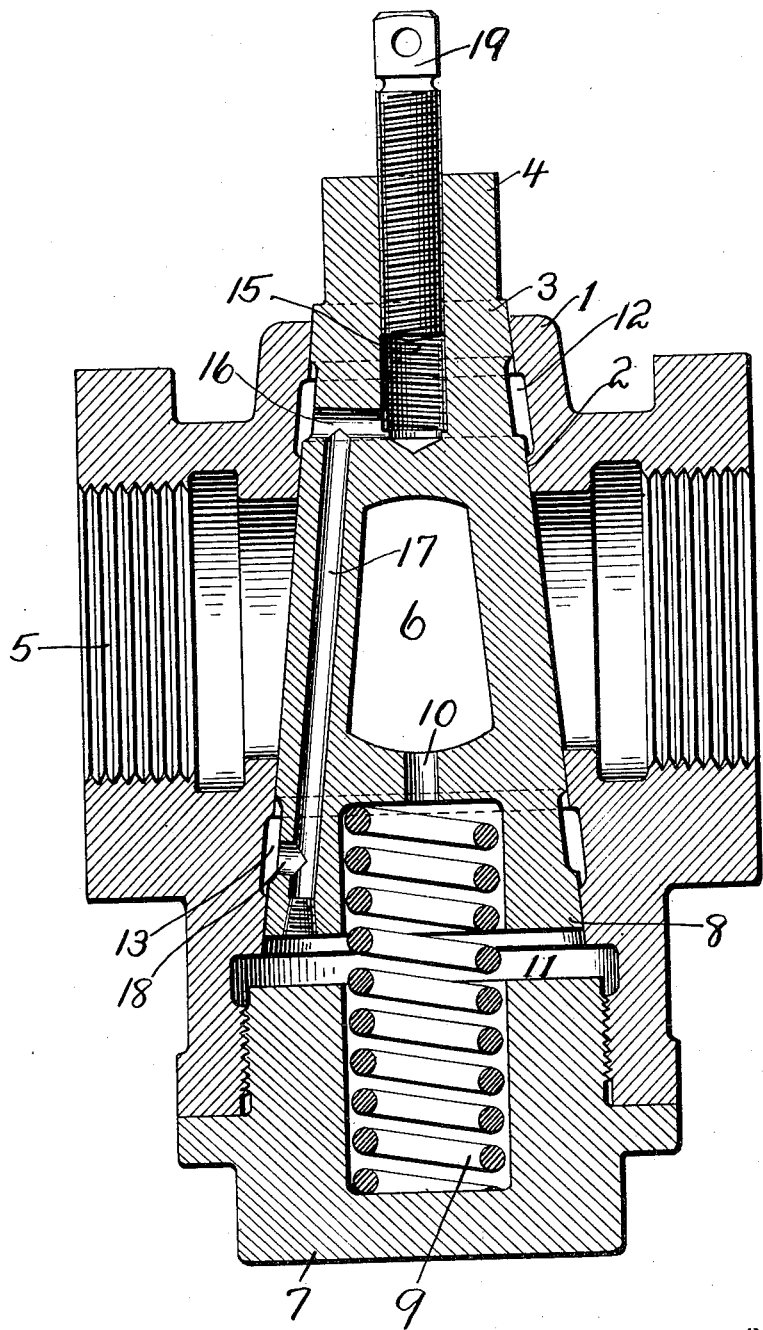

1,469,762

UNITED STATES PATENT OFFICE.

SVEN JOHAN NORDSTROM, OF SAN FRANCISCO, CALIFORNIA, ASSIGNOR OF ONE-HALF TO THE MERRILL COMPANY, OF SAN FRANCISCO, CALIFORNIA, A CORPORATION OF CALIFORNIA.

VALVE.

Application filed June 27, 1922. Serial No. 571,253.

*To all whom it may concern:*

Be it known that I, SVEN JOHAN NORDSTROM, a subject of the King of Sweden, and a resident of San Francisco, in the county of San Francisco and State of California, have invented certain new and useful Improvements in Valves, of which the following is a specification.

The invention relates to valves and more particularly to valves of the type wherein a fluid or plastic substance, such as the lubricant for lubricating the valve, is put under pressure for the purpose of lifting the valve plug from its seat, a valve of this type being described and claimed in my patent, Reissue No. 14,516, reissued August 27, 1918.

The valve illustrated in said patent is provided with a gasket and a stuffing box. For certain purposes and conditions of service, it is undesirable to employ valves provided with gaskets. The object of the present invention is to improve upon the construction of valves of the above-described type so that the use of packing may be eliminated. To this end, the invention consists in the improved valve more fully described hereinafter and particularly pointed out in the appended claims.

The preferred form of the invention is illustrated in the accompanying drawing in which the figure is a vertical section of the improved valve. The valve as shown in the drawing comprises a casing 1 provided with a transverse tapered hole 2 in which is seated a tapered plug 3, the upper end 4 of which projects beyond the casing and is squared to receive a wrench by which the plug may be turned. A passageway 5 extends longitudinally through the casing 1. In the plug 3 is a transverse hole 6 which is adapted to register with the passageway 5 when the plug is turned to open position. The lower end of the transverse hole 2 in the casing is closed by cap 7. Interposed between the cap 7 and the recessed larger end 8 of the plug 3 is a coiled spring 9 which holds the plug yieldingly against its seat. When the temperature of the fluid passing through the valve makes the use of a tempered spring undesirable, other yielding means such as asbestos, may be substituted for the spring. When the plug is turned to open position, it is also held against its seat by the fluid passing through the valve, and for this purpose the plug is provided with a hole 10 which permits the fluid to fill the chamber 11 and thereby exert a seating pressure upon the plug.

In order that the plug may be lifted from its seat, when that is necessary, the seating or bearing surface of the plug and the casing is provided with one or more recesses of such area that when the lubricant therein is put under sufficient pressure, the vertical component of the force exerted upon the plug will be sufficient to raise the plug against the counteracting pressure exerted upon it by the spring 9 and by the fluid in the chamber 11. The recess or recesses may be located either wholly in the bearing surface of the plug or wholly in the bearing surface of the casing, but in the preferred form of the invention they are located partly in the plug and partly in the casing. The term "seating surface" is a generic term which includes either the bearing surface of the plug or the bearing surface of the casing or both. So also the recesses may be variously positioned and of various form; it is preferred, however, to arrange the recesses as oppositely disposed annular grooves. Preferably there are two such sets of annular grooves, one set 12 located in the bearing surface above the passageway 5 and hole 6, and the other set 13 located below the passageway 5 and the hole 6. The fluid or plastic substance, which is used for the purpose of raising the plug from its seat and which is preferably the lubricant for lubricating the plug, is contained in a reservoir 15 formed in the small end of the plug. The reservoir 15 communicates with the grooves 12 by the transverse hole 16 and with the grooves 13 through the connecting hole 17 and the transverse hole 18. In the preferred form of valve the connecting hole 17 is located wholly within the body of the plug, so that, if desired, the plug may be turned completely around. It will be understood that the connecting hole 17 may be located in the casing whether the reservoir is located in the plug or in the casing. It will also be understood that instead of the connecting hole 17, the annular grooves 12 and 13 may be connected by one or two lubricant grooves in the seating surface, but in this case the valve must be provided with a 90° stop as in Reissue Patent, No. 14,516. The purposes for which the valve is used and mechanical considerations will determine the arrangement of these various features. When the plug is fast or "frozen" in its seat, the lubricating substance in the reservoir is put under pressure, so that it is forced into the grooves to lift the plug from its seat. For this purpose the reservoir is threaded to receive a set screw 19, by turning which the lubricant may be put under sufficient pressure to lift the plug by means of the vertical component of the force exerted thereon by the lubricant in the grooves 12 and 13.

Having thus described the invention what I claim as new is:—

1. A valve comprising a casing having a passageway therethrough, a plug seated in in the casing and having a hole adapted to register with the passageway through the casing, means for yieldingly holding the plug against its seat, recesses in the seating surface of the plug and the casing, a reservoir for containing fluid or plastic substance, connections between the reservoir and the recesses, and means for exerting pressure on the substance in the reservoir to force it into the recesses and thereby lift the plug from its seat.

2. A valve comprising a casing having a passageway therethrough, a plug seated in the casing and having a hole adapted to register with the passageway through the casing, means for normally holding the plug against its seat, circumferential grooves in the plug, circumferential grooves in the casing located opposite the grooves in the plug, a reservoir in the plug adapted to contain lubricant, connections between the reservoir and the grooves, and means for exerting pressure upon the lubricant in the reservoir to force it into the grooves and thereby lift the plug from its seat.

3. A valve comprising a casing, a plug seated in the casing, means for yieldingly holding the plug against its seat, two sets of oppositely disposed circumferential grooves in the bearing surface of the plug and the casing, a reservoir in the plug adapted to contain lubricant, holes wholly within the body of the plug connecting the reservoir with the grooves, and means for exerting pressure upon the lubricant in the reservoir to force it into the grooves and thereby lift the plug from its seat.

4. A valve comprising a casing having a passageway therethrough, a plug seated in the casing and having a hole adapted to register with the passageway through the casing, means for yieldingly holding the plug against its seat, the seating surface of the plug and casing being provided with a recess, a reservoir for containing fluid or plastic substance, connections between the reservoir and the recess, and means for exerting pressure on the substance in the reservoir to force it into the recess and thereby lift the plug from its seat.

SVEN JOHAN NORDSTROM.